(12) United States Patent
Meili

(10) Patent No.: US 6,589,395 B1
(45) Date of Patent: Jul. 8, 2003

(54) DISTILLATION PLANT WITH A COLUMN AND A HEAT PUMP

(75) Inventor: Albert Meili, Singapore (SG)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 09/333,794

(22) Filed: May 15, 1999

(30) Foreign Application Priority Data

Jun. 17, 1998 (EP) .............................................. 98810554

(51) Int. Cl.[7] .............................. B01D 3/14; B01D 3/32; F28B 1/00; F28B 9/00; F28D 21/00
(52) U.S. Cl. ..................... 202/182; 202/185.1; 202/270; 201/28; 201/30; 422/198; 422/200; 422/206; 165/61; 165/65; 165/66; 165/108
(58) Field of Search .............................. 202/182, 185.1, 202/186, 235, 243, 270; 422/198, 200, 206; 201/28, 30; 165/61, 65, 66, 108

(56) References Cited

U.S. PATENT DOCUMENTS 3,869,351 A   3/1975   Schwartzman .............. 202/172

5,935,388 A * 8/1999 Meszaros .................... 202/155

FOREIGN PATENT DOCUMENTS

EP   0835680 A1   4/1998
EP   0842686 A1   5/1998

OTHER PUBLICATIONS

Meili, Albert, "Heat Pumps for Distillation Columns," Chemical Engineering Progress, 86 (Jun. 1990), No. 6, pp 60–64.*

* cited by examiner

Primary Examiner—Jerry D. Johnson
Assistant Examiner—Alexa A. Doroshenk
(74) Attorney, Agent, or Firm—William Michael Hynes; Townsend and Townsend and Crew LLP

(57) ABSTRACT

The distillation plant comprises a column (1) and a heat pump (4, 5) which operates between a sump vaporizer (3) and an exhaust vapor compressor (2) of the column. The heat pump is substitutable by devices (6, 7) which can be switched to the sump vaporizer and the exhaust vapor compressor when required. These substituting devices comprise devices (6 and 7 respectively) for the production of vapor or the provision of a coolant respectively as well as connection means (63, 63', 72, 72'). The coolants can be liquids (water) or gases (air).

10 Claims, 2 Drawing Sheets

DISTILLATION PLANT WITH A COLUMN AND A HEAT PUMP

BACKGROUND OF THE INVENTION

The invention relates to a distillation plant with a column and a heat pump that operates between a sump vaporizer and an exhaust vapor compressor. The use of the plant is described.

In a distillation column heat is supplied to a sump for the production of a vapor, whereas in a column head a corresponding amount of heat is conveyed off for the liquefaction of vapors (often called exhaust vapors). The supply of heat in the sump and the conveying off of heat in the head are advantageously coupled via a heat pump process by means of which a heat transport as well as a heat conversion (i.e. temperature increase of the transported heat) can be carried out. A preferred method, the "direct exhaust vapor compression", can in many products not be used due to polymerization, decomposition, corrosion, low vapor density, etc. In such cases one distills conventionally without heat pumps or with a heat pump of which the working medium is a separate material which is conducted in an auxiliary circulation. In this the heat supply and the conveyance off of heat are carried out via indirect heat exchange in a sump vaporizer and in an exhaust vapor condensator respectively. Various materials come under consideration as working medium of the heat pump. For thermodynamic reasons and thanks to its lack of hazard to the environment, water is more advantageous in comparison with other possible materials and is therefore to be preferred.

A disadvantage of the use of heat pumps is that heat pump compressor failure results in a long standstill time in practice since the compression must be done with machines for which as a rule no rapid replacement is available.

SUMMARY OF THE INVENTION

The object of the invention is thus to provide a distillation plant in which this disadvantage with respect to a compressor failure is eliminated by means of suitable measures. This object is satisfied by a plant having a heat source (6) and a heat sink (7) which can be substituted for the heat pump.

The distillation plant comprises a column and a heat pump that operates between the sump vaporizer and an exhaust vapor condensator. The heat pump is substitutable by devices which can be switched to the sump vaporizer and the exhaust vapor condensator when required. These substituting devices comprise devices for the production of vapor or the provision of a coolant respectively as well as connection means. The coolants can be liquids (water) or gases (air).

A method of use, of such a plant is also set forth.

BRIEF DESCRIPTION OF THE DRAWINGS

The invention will be described in the following with reference to the drawings.

DESCRIPTION OF THE PREFERRED EMBODIMENTS

Figure 1:
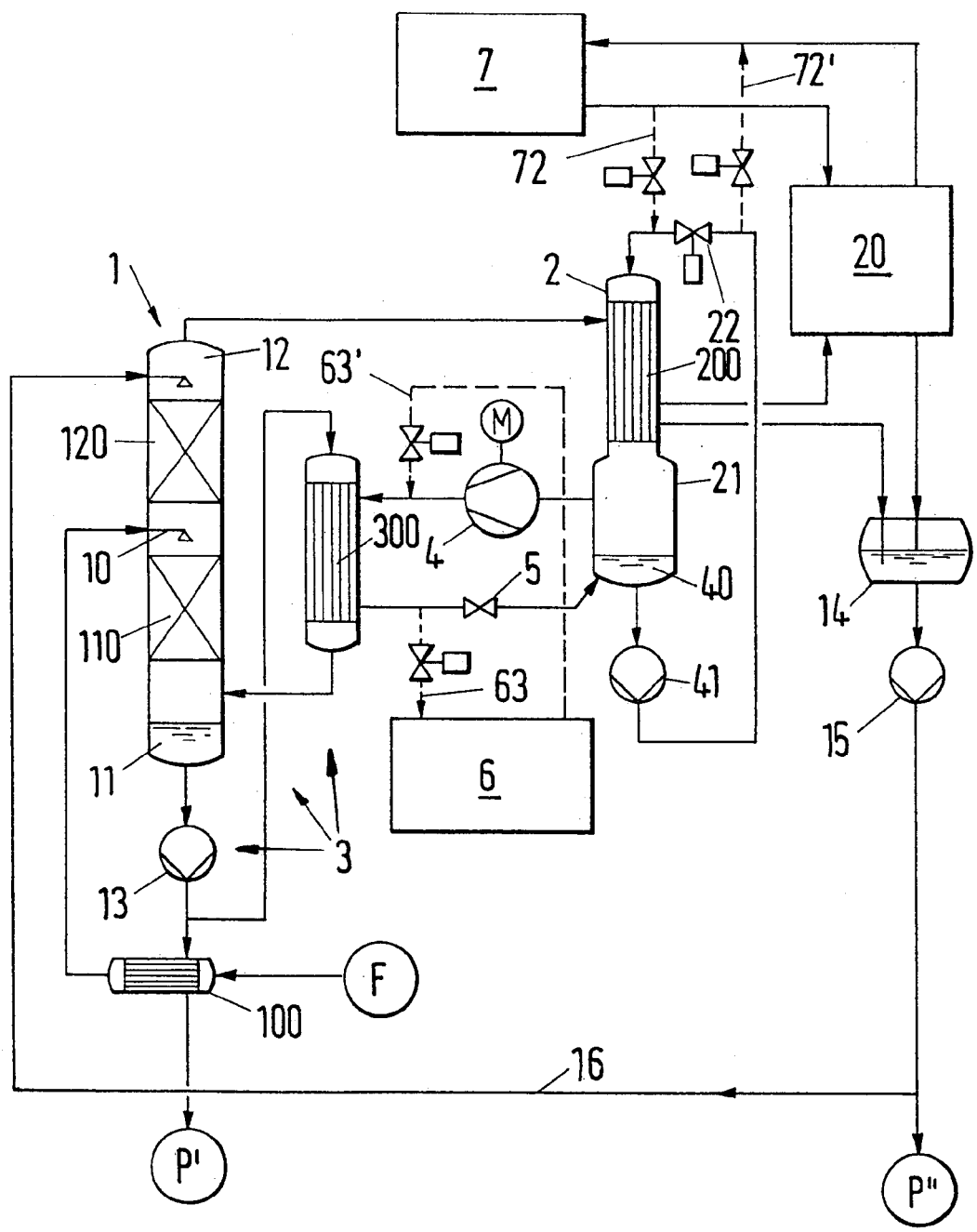
FIG. 1 is a schematic illustration of a first distillation plant in accordance with the invention.

The components of the plant are shown in FIG. 1. A column 1 for the carrying out of a distillation is shown comprising a distributor 10 for a raw product F (namely the material mixture to be treated), a sump 11, a column head 12 and installations 110 and 120 interior of the column. An exhaust vapor condensator 2 (condensator for the head vapors) has a sump 21 and a tube bundle 200 that is the vaporizer of a heat pump.

A pump 41 for the circulation of condensed working medium or fluid heat transfer media 40 of the named heat pump is shown. The fluid heat transfer media 40 is vaporized in the exhaust vapor condensator 2. A sump vaporizer 3 has tube bundles 300, the sump 11 of the column 1 and a circulation pump 13, which that can be part of the compressor of the heat pump.

The heat pump includes compressor 4 and a restrictor member 5 of the heat pump. A partial plant 20 for the removal of inert gases and of an excess heat which largely corresponds to the energy which is introduced into the process through the compressor operation is shown in FIG. 1.

A tank 14 for the head product P', from where condensed product P" is fed back into the column via a circulation pump 13 and a return line 16 is shown.

Furthermore, a heat sink 7, i.e. a device for the provision of a coolant (in particular cooling water or else air), and a heat source 6, i.e. a device for the production of vapor (in particular water vapor) are illustrated.

Heat from a sump product P' which is results from the distillation is further supplied in a heat exchanger 100 to the raw product F, which can already be preheated through a heat supply in the partial plant 20 before it is fed into the column 1.

In the event of a failure of the compressor 4, its connection lines are closed by means of closure members (not illustrated). A further closure member 22 in the vaporizer circulation of the exhaust vapor condensator 2 is likewise closed. At the same time the heat source 6 is connected to the sump vaporizer 3 via connection means 63, 63', which are indicated in broken lines, and the heat sink 7 is connected to the exhaust vapor condensator 2 via connection means 72, 72'.

Thus during a failure of the compressor 4, the operation of the distillation column 1 can now be continued in a conventional manner by means of non-coupled heat exchange operations, namely with the substituting devices 6, 7 for the production of vapor and for the provision of a coolant respectively.

With the plant in FIG. 1, for example, styrene can be separated from a mixture that contains the more volatile ethyl benzene and, in smaller amounts, toluene and benzene. The hardly volatile styrene can be heated in the vaporizer 3 with water vapor at 104° C. (pressure 1170 mbar) so that it can be vaporized in the sump 11 at a temperature of 100° C. The exhaust vapors in the head 12 with a temperature of 82° C. can be liquefied in the condensator 2 with condensed water at 77° C. (vapor pressure 416 mbar). The compressor 4 must compress water vapor from the sump 21 of the exhaust vapor condensator 2 from 416 to 1170 mbar.

For the conducting off of excess heat in the partial plant 20 it is as a rule advantageous to provide a cooler which is connected to a cooling water network 7. In the event of a compressor failure this cooling water network can be used as the substituting device for the provision of coolant.

A control unit (not illustrated) is advantageously provided by means of which a switching over from the heat pump to the substituting devices can be carried out as soon as a failure of the compressor 4 takes place.

The unit 6 for the production of vapor is as a rule a boiler that gives off vapor at for example 6 or 16 bar. Thus a pressure relaxation member is to be arranged in the connection means 63' between the boiler 6 and the sump vaporizer 3. It is possible to use a pressure relaxation member of this kind as part of the device 7 for the provision of coolant so that exergy that is available with the vapor can be converted into a cooling power with this member. For the purposes of this application, the term "exergy" is defined as the work capacity or maximal energy that is theoretically available for performing mechanical or electrical work. This will be illustrated subsequently with reference to FIG. 2 in which the pressure relaxation member is a vapor jet compressor 8.

Figure 2:
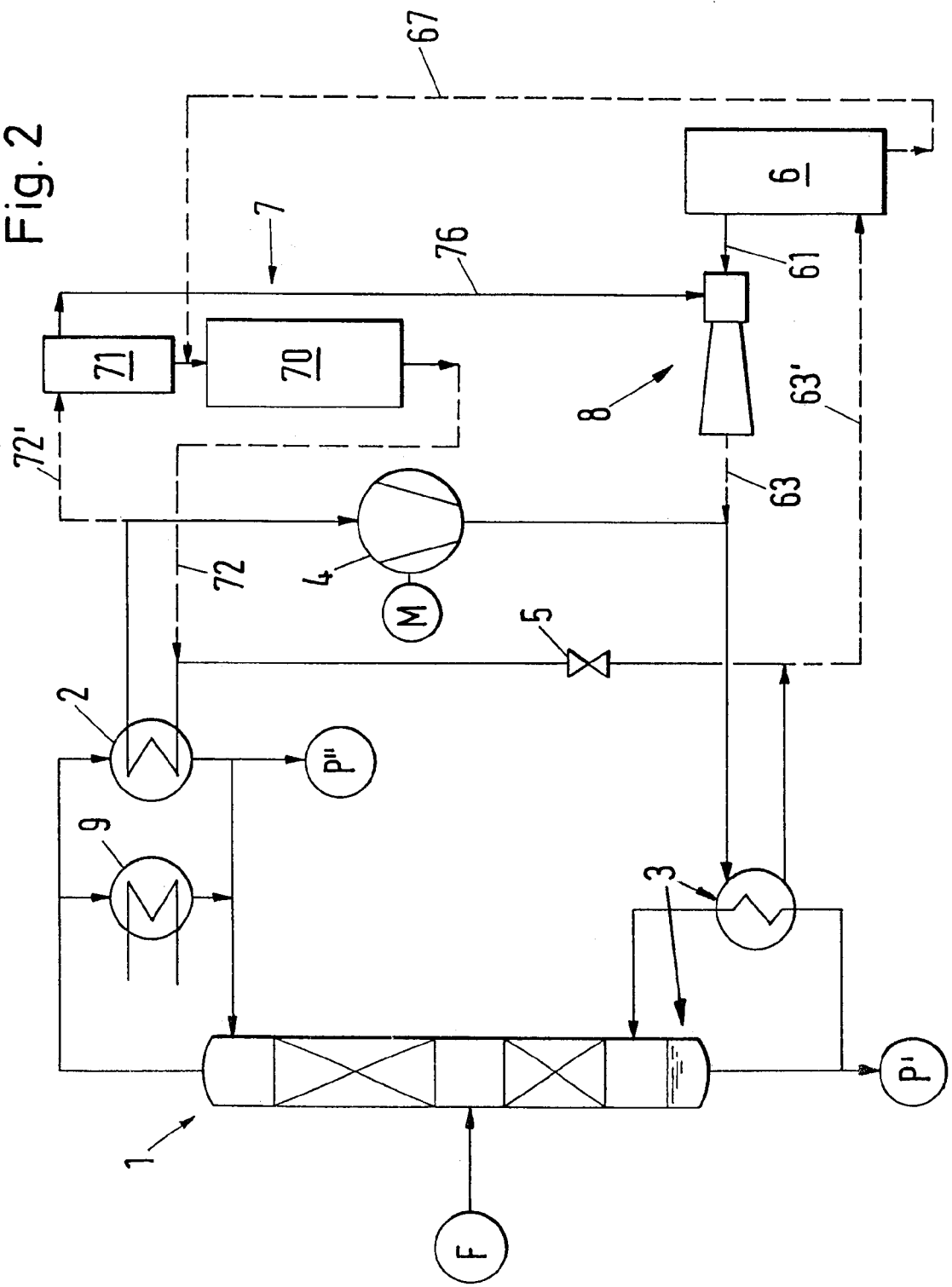
FIG. 2 is a corresponding illustration of a second plant.

In FIG. 2 the connections 63, 63', 72, 72', which are drawn in broken lines, are connection means for substituting devices 6, 7 into effective contact with the distillation column 1 via non-illustrated closure members (cf. FIG. 1). The cooling device 7 comprises a preliminary cooler 71 and a main cooler 70. In a substitution of the heat pump 4, 5, cooling water that has been warmed in the exhaust vapor condensator 2 is cooled down by several degrees Celsius in the preliminary cooler 71 through evaporation. It is then further cooled to the required first running temperature for the condensator 2 in the cooler 70. The vapor given off in the evaporation in the preliminary cooler 71 is sucked off via a line 76 and through the auxiliary compressor 8 that is formed as a vapor jet compressor.

In the example given above (styrene distillation), if the drive vapor (supply line 61) of the boiler 6 has a pressure of 16 bar, then the auxiliary compressor 8 and high pressure vapor which comprises a proportion of about 60%. 40% is low pressure vapor (about 400 mbar) and can be correspondingly sucked in so that in the line 63 100% vapor (1170 mbar) is available as a heat source for the sump vaporizer 3. The water that is condensed in the giving off of the heat is conducted back into the boiler 6 via the line 63'. An excess of condensate, which corresponds to the sucked-in low pressure vapor, can be given back via a line 67 into the cooling device 7 (and indeed into the cooler 70, as illustrated, or, better still, into the preliminary cooler 71).

The exhaust vapor condensator 2 can be formed as a device with tube bundles, at the tube surfaces of which the exhaust vapors condense in the form of falling films. Instead of a tube bundle compressor a plate compressor (an apparatus containing a plate stack) can also be used. The corresponding holds for the further heat exchangers, in which phase transitions take place.

A cooler 9 for the conveying off of excess heat is arranged in the plant of FIG. 2 parallel to the exhaust vapor condensator 2. In this the coolant can be air or water.

The plant in accordance with the invention can be used for the distillation of mixtures F of organic materials. Exhaust vapors are formed in this separation process at a temperature between 40 and 120° C. A sump product is vaporized at a temperature between 60 and 160° C. The heat pump process, through which the condensation of the exhaust vapors is coupled with the vaporization of the sump product, can be carried out with a compressor 4, which can be driven by an electric motor M, a gas motor, a steam turbine or a gas turbine. In the use of water as a working medium 40, a one-stage turbo-compressor, the blade wheel of which is advantageously manufactured of titanium, can be employed for the compressor 4.

In accordance with the fundamental object of the invention, a switching over from an operation with the heat pump 4, 5 to an operation with the substituting devices 6, 7 is carried out in the event of a compressor failure.

The substituting devices 6, 7 can also advantageously be used in the starting up of the distillation in that they are connected to the sump vaporizer 3 and to the exhaust vapor condensator 2 respectively prior to putting the compressor 4 into operation.

If the plant in accordance with FIG. 2 is also used with an electrically driven compressor 4, then an alternating operation with the heat pump and the substituting devices respectively can lead to an optimizing of the energy costs. Namely, during the day the costs of the electrical energy can be substantially higher than during the night. The costs for the vapor production are relatively low, so that the increased energy requirement connected with the substituting devices causes lower costs as a whole as a result of the higher costs of the electrical energy. Thus for the saving of energy costs the operation can be carried out during the night with the heat pump 4, 5 and during the day with the substituting devices 6, 7, 8.

What is claimed is:

1. In a distillation plant having
   a column (1) having a sump for liquid product and an outlet for vaporized product;
   a sump vaporizer (3) for supplying heat from a heat exchange media to the column sump for vaporization of product in the sump from liquid product to vaporized product;
   a condenser connected to outlet of the column for removing heat to a fluid heat exchange media for condensing the vaporized product to distilled product;
   a single fluid heat exchange media other than product for cooling the condenser and heating the sump vaporizer; and,
   a heat pump including a compressor (4) receiving vaporized single fluid heat exchange media from the condenser, compressing the fluid heat exchange media to heat the fluid exchange media, and circulating the compressed fluid heat exchange media to the sump vaporizer (3) to vaporize product and condense the fluid heat exchange media;
   the improvement to the distillation plant comprising:
      a supply of the single fluid exchange media independent of the heat pump;
      a heat sink for receiving heat from the fluid exchange media independently of the heat pump;
      a heat source for supplying heat to the fluid exchange media heating the sump vaporizer independently of the heat pump; and,
      connection means (63, 63', 72, 72') across the vapor compressor (4) for connecting the supply of the single fluid exchange media to the heat sink from the condenser and connecting the supply of the single fluid exchange media from the heat source to the sump vaporizer to operate the distillation plant independently of the compressor (4) of the heat pump.

2. The distillation plant in accordance with claim 1 further including:
   a control unit provided for switching over from the heat pump to the heat sink and heat source.

3. The distillation plant in accordance with claim 1 wherein:
   the heat source is a boiler; and,
   a pressure relaxation member is arranged in the connection means between the boiler and the sump vaporizer, whereby the pressure relaxation member can exploit exergy which is available with the vapor.

4. The distillation plant in accordance with claim 1 wherein:

the fluid heat exchange media is water, subjected to phase transitions during the operation of the heat pump.

5. A method of utilizing a distillation plant comprising the steps of:

providing a column (1) having a sump for liquid product and an outlet for vaporized product;

providing a sump vaporizer (3) for supplying heat from heat exchange media to the column sump for vaporization of product in the sump from liquid product to vaporized product;

providing a condenser connected to the outlet of the column for removing heat to heat exchange media for condensing the vaporized product to distilled product;

providing a single heat exchange media for cooling the condenser and heating the sump vaporizer;

providing a heat pump including an exhaust vapor compressor (4) receiving cooling heat exchange media from the condenser, compressing the heat exchange media to heat the heat exchange media, and circulating the heated heat exchange media to the sump vaporizer (3) to vaporize product;

providing a supply of the single heat exchange media independent of the heat pump;

providing a heat sink for receiving heat from the heat exchange media cooling the condenser independently of the heat pump;

providing a heat source for supplying heat to the heat exchange media heating the sump vaporizer independently of the heat pump; and, connecting the heat sink and the heat source across the vapor compressor (4) for connecting the supply of the single heat exchange media independent of the heat pump to the heat sink from the condenser and connecting the supply of the single heat exchange media independent of the heat pump from the heat source to the sump vaporizer to operate the distillation plant independently of the vapor compressor of the heat pump.

6. The method of utilizing a distillation plant according to claim 5 comprising the further steps of:

providing product comprising a mixture (F) of organic materials fed into the column (1) in liquid form;

maintaining vaporized product with a temperature between 40 and 120° C.;

maintaining sump liquid product with a temperature between 60 and 160° C.; and, employing the heat pump for a heat conversion and heat transport in that a compressor (4) of the heat pump is driven by a motor (M).

7. The method of utilizing a distillation plant according to claim 6 comprising the further steps of:

selecting the motor (M) from a group of motors consisting of a gas motor, a steam turbine or a gas turbine.

8. The method of utilizing a distillation plant according to claim 6 wherein:

the provided compressor is a one-stage turbo-compressor.

9. The method of utilizing a distillation plant according to claim 5 comprising the further steps of:

starting the distillation plant by connecting the sump vaporizer (3) to the heat source and the vapor compressor (4) to the heat sink.

10. The method of utilizing a distillation plant according to claim 5 comprising the further steps of:

optimizing energy costs by connecting the sump vaporizer (3) to the heat source and the vapor compressor (4) to the heat sink.

* * * * *